(12) United States Patent
Tenra et al.

(10) Patent No.: US 9,855,725 B2
(45) Date of Patent: Jan. 2, 2018

(54) VACUUM HEAT INSULATOR AND TESTING METHOD FOR THE GLASS FIBER LAMINATE TO BE USED IN THE INSULATOR

(75) Inventors: Tomohisa Tenra, Shiga (JP); Masamichi Hashida, Shiga (JP)

(73) Assignee: PANASONIC CORPORATION, Osaka (JP)

( * ) Notice: Subject to any disclaimer, the term of this patent is extended or adjusted under 35 U.S.C. 154(b) by 915 days.

(21) Appl. No.: 11/919,866

(22) PCT Filed: May 19, 2006

(86) PCT No.: PCT/JP2006/310021
§ 371 (c)(1),
(2), (4) Date: Nov. 5, 2007

(87) PCT Pub. No.: WO2006/126456
PCT Pub. Date: Nov. 30, 2006

(65) Prior Publication Data
US 2009/0029095 A1 Jan. 29, 2009

(30) Foreign Application Priority Data

May 23, 2005 (JP) .................................. 2005-149483
May 26, 2005 (JP) .................................. 2005-153502

(Continued)

(51) Int. Cl.
B29D 23/00 (2006.01)
B32B 17/02 (2006.01)
F16L 59/065 (2006.01)

(52) U.S. Cl.
CPC ............ *B32B 17/02* (2013.01); *F16L 59/065* (2013.01); *F25D 2201/14* (2013.01); *Y10T 428/239* (2015.01)

(58) Field of Classification Search
CPC ..... F16L 59/065; F16L 59/06; F25D 2201/14; B32B 17/02
(Continued)

(56) References Cited

U.S. PATENT DOCUMENTS 5,330,816 A  7/1994  Rusek, Jr.
5,795,639 A  8/1998  Lin
(Continued)

FOREIGN PATENT DOCUMENTS

CN  1106255 C  4/2003
CN  1609497 A  4/2008
(Continued)

OTHER PUBLICATIONS

Mag Hard, Glass Wool Insulation, 2011.*
(Continued)

*Primary Examiner* — Camie Thompson
(74) *Attorney, Agent, or Firm* — McDermott Will & Emery, LLP

(57) ABSTRACT

Vacuum insulator includes core member and jacket which covers core member. Jacket is decompressed its interior and core member includes a glass-fiber laminated unit. The glass fiber is formed of toughened glass-fiber which is low brittle and its fiber strength is toughened. This structure allows improving the heat insulating performance as well as lowering the material cost of vacuum insulator.

13 Claims, 5 Drawing Sheets

(30) Foreign Application Priority Data

Sep. 7, 2005 (JP) ................................ 2005-258807
Dec. 8, 2005 (JP) ................................ 2005-354424

(58) Field of Classification Search
USPC .................................................. 428/36.1, 69
See application file for complete search history.

(56) References Cited

U.S. PATENT DOCUMENTS

| | | |
|---|---|---|
| 6,881,467 B2 | 4/2005 | Jung et al. |
| 6,938,968 B2 | 9/2005 | Tanimoto et al. |
| 7,323,079 B2 | 1/2008 | Kondo et al. |
| 2002/0167105 A1 | 11/2002 | Jung et al. |
| 2003/0157284 A1* | 8/2003 | Tanimoto et al. ........... 428/36.1 |
| 2005/0175809 A1* | 8/2005 | Hirai et al. ..................... 428/69 |
| 2006/0263585 A1 | 11/2006 | Yuasa et al. |

FOREIGN PATENT DOCUMENTS

| | | | |
|---|---|---|---|
| EP | WO 03/102460 | * | 11/2003 |
| EP | WO2004/051134 | * | 6/2004 |
| EP | 1 510 747 A1 | | 3/2005 |
| GB | 2351695 A | | 1/2001 |
| JP | 58-106292 | | 6/1983 |
| JP | 7-103955 | | 10/1985 |
| JP | 02-026850 A | | 1/1990 |
| JP | 11-505591 A | | 5/1999 |
| JP | 2002-081596 A | | 3/2002 |
| JP | 2003-532845 | | 11/2003 |
| JP | 2003-532845 A | | 11/2003 |
| JP | 2004-011908 A | | 1/2004 |
| JP | 3578172 B1 | | 10/2004 |
| JP | 2005-061611 A | | 3/2005 |
| JP | 2005-127409 | | 5/2005 |
| JP | 2005-127409 A | | 5/2005 |
| KR | 2003-0060192 | | 7/2003 |
| WO | WO 01/85445 A1 | | 11/2001 |
| WO | WO 03/058113 A1 | | 7/2003 |

OTHER PUBLICATIONS

Japanese Office Action issued in Japanese Patent Application No. JP 2005-258807 dated Feb. 9, 2010.
Korean Office Action issued in Korean Patent Application No. KR 10-2007-7019642, mailed Jun. 19, 2008.
Extended European Search Report issued in European Patent Application No. 06756377.5, dated Oct. 28, 2011.
Written request for the invalidation trial filed in corresponding Chinese Patent 201210227893.4 on Oct. 15, 2016 (concise explanation is provided).
Report of Anaylsis of VIP (Vacuum Insulation Panel) Inside the Haier Products (Refrigerator) (concise explanation is provided).
Materials regarding date of production of Haier's refrigerator (concise explanation is provided).
Internet information regarding Haier's refrigerator (concise explanation is provided).
"Glass Fibre and Mineral Wool Encyclopedia," claimed to publish on Mar. 2001 (concise explanation is provided).
"Manual for glass," claimed to publish on Apr. 1985 (concise explanation is provided).

* cited by examiner

PRIOR ART

VACUUM HEAT INSULATOR AND TESTING METHOD FOR THE GLASS FIBER LAMINATE TO BE USED IN THE INSULATOR

RELATED APPLICATIONS

This application is the U.S. National Phase under 35 U.S.C. §371 of International Application No. PCT/JP2006/310021, filed on May 19, 2006, which in turn claims the benefit of Japanese Application No. 2005-149483, filed on May 23, 2005, Japanese Application No. 2005-153502, filed on May 26, 2005, Japanese Application No. 2005-258807, filed on Sep. 7, 2005, and Japanese Application No. 2005-354424, filed on Dec. 8, 2005, the disclosures of which Applications are incorporated by reference herein.

TECHNICAL FIELD

The present invention relates to a vacuum insulator including a core member with a jacket of which interior is decompressed and shielded, and it also relates to a method of inspecting glass fiber laminated unit to be used in the same vacuum insulator.

BACKGROUND ART

In general, the core member to be used in a vacuum insulator has a small heat conduction rate, and inorganic chemical compounds generating little gas are suitable for this core member. The vacuum insulator employing a glass-fiber laminated unit, among others, as the core member is excellent in heat insulating performance. An example of such core member is disclosed in Examined Japanese Patent Publication No. H07-103955 (hereinafter referred to as Patent Document 1). FIG. 8 schematically shows a cross sectional view of the core member disclosed in Patent Document 1.

As shown in FIG. 8, inorganic thin fibers 101a (hereinafter referred to as fiber 101a) such as glass fiber are laminated one after the other such that their longitudinal direction becomes vertical with respect to the heat transfer direction of the vacuum insulator. On top of that, fibers 101a are laminated at random such that they cross with each other in longitudinal direction and make point contacts between them. Penetration fibers 101c (hereinafter referred to as fiber 101c) are inserted such that they run in parallel with the heat transfer direction. Inorganic thin fiber mat 101d is thus formed. A plurality (N sheets) of inorganic thin fiber mats 101d are piled up, thereby forming core member 101. Core member 101 is mounted to jacket (not shown) made of stainless steel, whereby the vacuum insulator is completed.

DISCLOSURE OF INVENTION

A vacuum insulator of the present invention includes a core member with its jacket whose interior is decompressed. The core member is formed by laminating glass fibers which is low brittle and of which fiber is toughened. This structure allows improving heat insulating performance and reducing the material cost of the vacuum insulator.

The present invention also provides a method of inspecting a laminated unit of glass fibers. This laminated unit is used in the vacuum insulator formed of a core member formed of the glass fiber laminated unit and the jacket covering the core member and being decompressed its interior.

This inspection method comprises the following steps:

a pretreatment compressing step for compressing the glass fiber laminated unit up to pretreatment compressive strength $P_0$;

a first compressing step for further compressing the glass fiber laminated unit up to load compressive strength $P_1$ and, during this step, detecting a thickness of the laminated unit as datum thickness T when the compressive strength reaches reference compressive strength $P_A$;

a second compressing step for still further compressing the laminated unit up to load compressive strength $P_1$ and, during this step, detecting a compressive strength as measured compressive strength $P_M$ when the thickness of the laminated unit reaches datum thickness T; and a calculating step for calculating repeated compressive strength ratio X of the laminated unit by using $X = P_M / P_A$.

Use of this inspection method allows a simple inspection of the glass fiber laminated unit to be used in the vacuum insulator of which heat insulating performance is improved and material cost is reduced.

Figure 1:
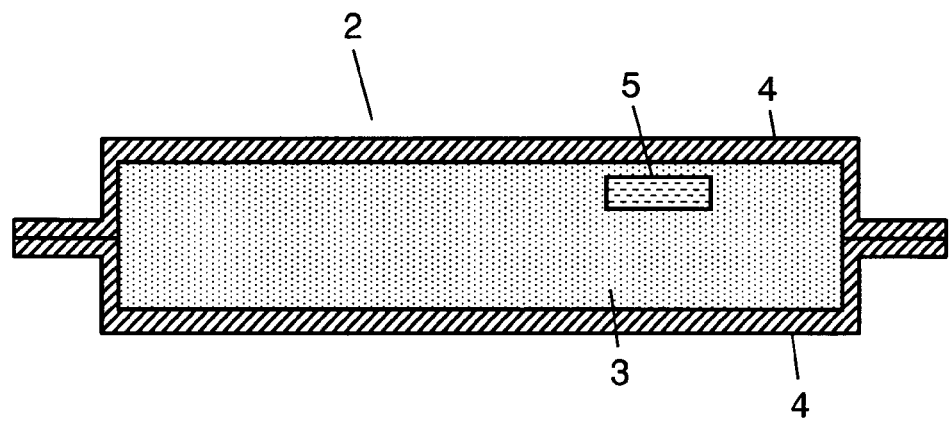
FIG. 1 shows a sectional view of a vacuum insulator in accordance with a first embodiment of the present invention.

DESCRIPTION OF REFERENCE MARKS 2, 2a, 2b, 2c vacuum insulator
3, 3a, 3b, 3c core member
4 jacket
4a upper film
4b lower film
5 adsorbent
21, 21a, 21b, 21c glass fiber
22, 22a, 22b laminated unit
23 glass fiber web
27 thermally welded section
28 vacuum space

DESCRIPTION OF PREFERRED EMBODIMENTS

Since the core member used in a conventional vacuum insulator has a structure in which inorganic thin fibers such as glass fibers make point contacts with each other, a contact thermal resistance at each one of the point contacts of the inorganic thin fibers becomes great, so that the core member transfers a little amount of heat along its thickness direction.

However, the inorganic thin fiber disposed vertically with respect to the heat transfer direction of the vacuum insulator is not strong enough to bear the atmospheric pressure applied to the insulator along the heat transfer direction, so that the resistance to compression of the vacuum insulator is lowered. The atmospheric pressure applied to a vacuum-packaged vacuum insulator thus compresses the core member, and changes the thickness of the core member. In order to overcome this problem, penetration fibers are inserted into the core member in parallel with the heat transfer direction of the vacuum insulator, whereby the resistance to compression along the heat transfer direction of the vacuum insulator can been enhanced.

Use of the penetration fibers, however, lowers the heat insulating performance along the heat transfer direction of the vacuum insulator. To overcome this problem, plural sheets of mats made of inorganic thin fibers are piled up, so that the heat insulating performance along the heat transfer direction is enhanced.

The structure discussed above of a conventional vacuum insulator allows the penetration fibers to increase the heat conductivity, so that the pile-up of plural sheets of mats formed of inorganic thin fibers is not enough to lower the heat conductivity, and as a result, heat is still transferred in a large amount.

On the other hand, the structure of the core member, in which inorganic thin fibers such as glass fibers are laminated only along the vertical direction with respect to the heat transfer direction of the vacuum insulator, tends to increase the heat conductivity step by step due to the following reasons.

The vacuum insulator always receives a pressure produced by a difference in atmospheric pressure between the interior and the exterior of the jacket, so that the core member covered with the jacket receives compressing force via the jacket. Inside the core member, glass fibers are tangled, and when the compressing force due to the atmospheric pressure is applied to the core member, tensile stress as well as bending stress is applied to the glass fibers, so that the glass fibers are distorted and broken.

The distortion in the glass fibers reduces the sizes of voids formed by the tangles of glass fibers to smaller ones. Thus a great distortion in the glass fibers will touch a fiber to another one even they have not touched to each other when no compression force has been applied. A contact point of the glass fibers works as a heat transferring path, so that the heat conductivity of the core member increases.

Breakages in glass fibers crush the voids, formed by the tangles of the glass fibers, as a growing distortion also crush the voids. The crush of the voids increases the number of point-contacts between the glass fibers, and on top of that, glass fibers in part make line-contacts with each other, so that the contact area between the glass fibers increases. As a result, contact thermal resistance of the glass fibers of the core member decreases. The voids can be filled with flakes of broken glass fibers, so that the voids become further smaller, and the number of point contacts of the glass fibers increases.

Due to the reasons discussed above, an amount of heat traveling through the core member increases, and the heat insulating performance of the vacuum insulator lowers. Since the foregoing structure cannot secure a sufficient thickness of the core member, the core member needs the greater amount of glass fibers, so that the material cost increases.

A vacuum insulator of the present invention has a better heat insulating performance and a lower material cost than the foregoing conventional one. The present invention also provides a simple method of inspecting a glass-fiber laminated unit suitable for the core member of the vacuum insulator of the present invention. The present invention thus allows obtaining the vacuum insulator, of which insulating performance is improved and material cost is lowered, with ease. Exemplary embodiments of the present invention are demonstrated hereinafter with reference to the accompanying drawings. Not to mention, the present invention is not limited to following embodiments.

Exemplary Embodiment 1

Figure 2:
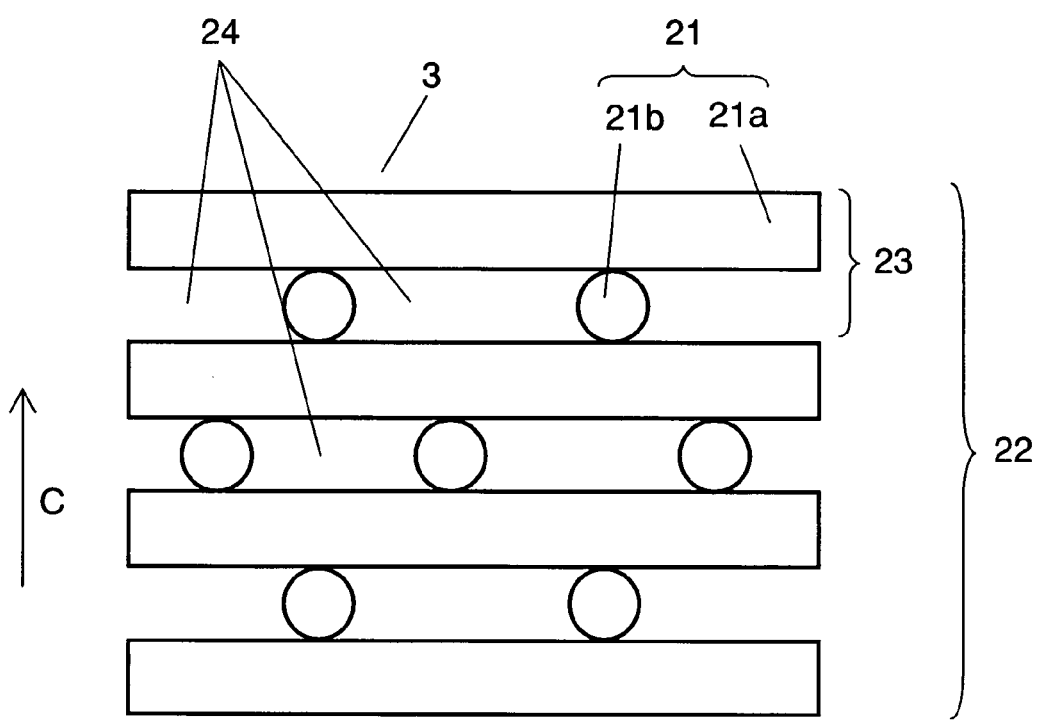
FIG. 2 shows a schematic sectional view of a core member of the vacuum insulator shown in FIG. 1.

FIG. 1 shows a sectional view of a vacuum insulator in accordance with the first embodiment of the present invention. FIG. 2 shows a schematic sectional view of a core member to be used in the vacuum insulator shown in FIG. 1. As shown in FIG. 1 and FIG. 2, vacuum insulator 2 is formed of core member 3 and adsorbent 5 both of which covered with jacket 4 of which interior is decompressed. Core member 3 is formed of laminated unit 22 which is formed into a plate-like shape. Laminated unit 22 is formed by laminating glass fiber webs 23 (hereinafter referred to simply as web 23). Characteristics such as a thickness and a density of core member 3 are adjusted such that a thickness of vacuum insulator 2 becomes 10 mm. Jacket 4 covers vacuum insulator 2 as armoring material.

As shown in FIG. 2, web 23 is formed of glass fibers 21a disposed substantially in parallel with the cross section of core member 3 and glass fibers 21b disposed substantially in vertical direction with respect to the cross section of core member 3. Glass fibers 21a and glass fibers 21b form glass fibers 21 (hereinafter referred to as fibers 21).

Core member 3 is formed this way: glass wool made of webs 23 is piled up to a given thickness, so that laminated unit 22, in which fibers 21 are tangled and thus coupled with each other, is formed. Then laminated unit 22 undergoes a heat & press process for five minutes to be formed into a plate like shape. The heating is done at 450° C. that is lower than the distortion point of fibers 21.

At the heat & press process, a binder (not shown) can be used for molding core member 3 having a higher rigidity. A method of forming core member 3 into a plate-like shape is determined based on the quality and productivity of vacuum insulator 2 needed from the market.

Here are the steps of producing vacuum insulator 2 from core member 3. First, core member 3 is dried in a drying oven at 140° C. for 20 minutes, and then inserted into jacket 4. The interior of jacket 4 is decompressed to not greater than 10 Pa in a decompression chamber (not shown). Then an opening (not shown) of decompressed jacket 4 is welded to be closed and thus sealed.

Fiber 21 to be used in core member 3 employs a glass fiber having a low brittleness and being toughened. This structure allows minimizing a decrease in compressive strength against compression of core member 3 at its datum thickness when compressing force is applied to core member 3 repeatedly. Fiber 21 to be used as core member 3 employs known fibers, and it preferably employs a narrow fiber having low heat conductivity. More preferably, the fiber has tensile strength not lower than 0.5 GPa.

Web 23 is preferably formed such that fibers 21 are disposed at random and make point-contacts with each other. More preferably, webs 23 are coupled to each other in order to maintain at least the unity of laminated unit 22 such that fibers 21 are tangled each other in a minimized quantity, and the lamination is done evenly along the thickness direction (arrow mark C) of laminated unit 22.

Use of such laminated unit 22 in core member 3 allows the contact thermal resistance of point contacts formed between fibers 21 to become a dominant factor over the heat conductivity along the thickness direction (arrow mark C) of core member 3 rather than the heat conductivity proper to fiber 21. For instance, glass fiber to be used for general purpose has heat conductivity around 1 W/mK at an ambient temperature. This glass fiber is used as fiber 21 forming core member 3 of vacuum insulator 2, then an apparent heat conductivity of solid composition of laminated unit 22 becomes not greater than 1% of the heat conductivity proper to this glass fiber per se.

A diameter of fiber 21 is not specified; however, use of thinner fibers 21 allows vacuum insulator 21 to gain the better heat insulating performance. It is preferable to use fiber 21 having average diameter 3-5 µm from the economical standpoint.

A method of processing fiber 21 to have lower brittleness and higher strength is demonstrated hereinafter. Appropriate composition of glass and appropriate manufacturing process will make fiber 21 having lower brittleness and higher strength. For instance, a chemical strengthening method, an ion exchange method, and a heat & quench method are available in the method of appropriate manufacturing process for increasing mechanical strength of fiber 21.

The chemical strengthening method erodes the glass surface with hydrofluoric acid. This method can remove Griffith flaws from the glass surface, thereby improving brittleness and mechanical strength of the glass fiber.

The ion exchange method replaces Na ions on the glass surface with K ions having a greater molecular diameter, thereby forming a layer having high compressive stress on the glass surface. The brittleness and mechanical strength of the glass fiber can be improved by the ion exchange method as the chemical strengthening method does.

The heat & quench method is most widely used industry-wise. This method is sometimes called air-blast quench method. This method blasts air at a low temperature swiftly to heated glass, thereby forming a layer having high compressive stress which improves the endurance against tensile stress, on the glass surface.

The heat & quench method is applicable also to the glass fiber. Cooled air is blasted to the glass fiber immediately after the glass material is fiberized and thus the glass fiber stays still at a high temperature, so that the glass fiber is toughened. The heat & quench method is carried out in connection with the heat process which fiberizes the glass material, so that an efficient process can be expected.

A method of increasing the mechanical strength of the glass fiber is not limited to the foregoing methods used industry-wise, and other known methods can be also used.

Jacket 4 is formed of plastic laminated film having three layers, namely, an outer layer, middle layer, and inner layer. Jacket 4 is molded into a sack-like shape because the plastic laminated film is welded at its three sides. The outer layer is made of polyethylene terephthalate film having 12 µm thickness, and the middle layer is made of aluminum foil having 6 µm thickness. The inner layer is a heat-welded layer made of straight-chain low-density polyethylene film having 50 µm thickness.

Adsorbent 5 for adsorbing water is made from calcium oxide. Glass web 23, one of the elements of core member 3, undergoes the following manufacturing steps to increase a percentage of the glass fiber having greater strength against tensile breakage: Glass 21 is made from generous-purpose soda-lime glass composition. A fiberizing machine spinning at a high speed discharges a fiberized glass. Immediately after fiber 21 is fiberized, cooled air is blasted to fiber 21, so that the surface of fiber 21 is quenched and toughened.

When core member 3 receives compressing force due to atmospheric pressure, tensile force is applied to fibers 21 tangled inside core member 3. Fibers 21 have been toughened, so that it has greater tensile breakage strength. The application of tensile force to fibers 21 is thus not enough to break fibers 21. As a result, voids 24 around fibers 21 are maintained, and fibers 21 adjacent to each other are maintained not to touch to each other. On top of that, breakages of fibers 21 can be suppressed, so that the touches between fibers 21 caused by free ends of broken fibers 21 can be suppressed. Core member 3 employing fibers 21 with fewer breakages invites little reduction in the heat insulating performance, which reduction occurs due to direct touches between fibers 21.

The heat conductive rate of vacuum insulator 2 thus produced is measured with a heat conductive rate measuring instrument such as "Auto A" manufactured by "EIKO SEIKI" in Japan. The heat conductive rate of vacuum insulator 2 is measured as good as 0.0015 W/mK at average temperature 24° C. Core member 3 undergoes a repeated compression test, and finds the result of first repeated compressive strength ratio $X_1$ is 0.93, and second repeated compressive strength ratio $X_2$ is 0.8. These ratios $X_1$ and $X_2$ are detailed later.

Vacuum insulator 2 thus produced employs core member 3 in which fibers 21 having low brittleness and being toughened are used. This structure allows core member 3 to suppress the reduction in the compressive strength when repeated compression is applied to core member 3.

Since the resistance to compression applied to core member 3 is improved as discussed above, a void rate between core members 3 increase so that the density of core member 3 can be lowered. As a result, a volume of core members 3 to be used in vacuum insulator 2 is reduced, which lowers the material cost.

Laminated unit 22 of core member 3 is formed into a plate-like shape by a heat forming method using heat & press, so that binder for forming is not needed, and the heat insulating performance changes only a little with time. Vacuum insulator 2 excellent in heat insulating performance is thus obtainable.

Next, a method of inspecting a glass-fiber laminated unit is demonstrated hereinafter with reference to FIG. 3. A method of finding a repeated compressive strength ratio (hereinafter referred to as a compression ratio) in the repeated compression test for core member 3 and a method of finding a thickness ratio are also described specifically.

First, in a preparatory step, a test sample of laminated unit 22 or core member 3 formed by laminating fibers 21 is prepared for measuring the compression ratio in the repeated compression test carried out to laminated unit 22 or core member 3 (S21). The sample undergoes a compression test for measuring its compression ratio as well as thickness ratio.

Then in a pretreatment step, the sample is compressed up to pretreatment compressive strength $P_0$ hPa (S22) in order to remove the compression record and obtain more accurate data, which record includes the compressions, such as the compression at the vacuum packaging, done to laminated unit 22 or core member 3 before they are built into vacuum insulator 2.

Next, in a first compressing step, the sample is compressed up to load compressive strength $P_1$ hPa as the first compression, and then the compression force is swiftly removed (S23), which restores the sample to a given thickness. In the first compression, the thickness when the compressive strength reaches reference compressive strength $P_A$ hPa is measured and found as datum thickness T mm.

In a second compressing step, the sample is compressed at the same section as the first compression again up to load compressive strength $P_1$ hPa (S24), i.e. the sample receives the compression force twice. In this second compressing step, the compressive strength when the thickness of the sample becomes datum thickness T is measured and found as compressive strength $P_M$ hPa. On top of that, the thickness of the sample when the compressive strength of compression force applied to the sample reaches reference compressive strength $P_A$ is measured and found as measured thickness $T_M$ mm.

In a calculating step, the compression ratio and the thickness ratio are calculated (S25). Repeated compressive strength ratio X (hereinafter referred to as compression ratio X) is calculated with equation $X=P_M/P_A$. Thickness ratio Y is calculated with equation $Y=T_M/T$.

In a determining step, the sample having undergone the compression test is inspected whether or not it is suitable for laminated unit 22 or core member 3 to be used in vacuum insulator 2 with respective to determining exercises (S26). Compression ratio determining exercise $X \geq X_S$ is used for determination based on the compression ratio, where $X_S$ is a threshold value of the compression ratio. Thickness ratio determining exercise $Y \geq Y_S$ is used for determination based on the thickness ratio, where $Y_S$ is a threshold value of the thickness ratio. The samples are determined or screened before the inspection is completed (S27 or S28).

In the inspection method discussed above, both of the compression ratio and the thickness ratio are found, calculated, and determined in the respective steps. However, it is not necessarily to find, calculate, and determine both of the ratios. For instance, an inspection method using only the thickness ratio or a method using only the compression ratio is acceptable. Thus it should be appropriately determined whether the inspection method using both of the ratios or either one of them is adopted.

Assume that the first inspection condition is established as follows:
first pretreatment compressive strength $P_{01}$ is set at 1500 hPa;
first load compressive strength $P_{11}$ (hereinafter referred to as compressive strength $P_{11}$) is set at 2000 hPa as load compressive strength $P_1$; and
first reference compressive strength $P_{A1}$ (hereinafter referred to as compressive strength $P_{A1}$) is set at 1800 hPa as reference compressive strength $P_A$.

Then during the first compression in the first compressing step, a thickness at compressive strength $P_{A1}=1800$ hPa is measured and found as first datum thickness $T_{1800}$ (hereinafter referred to as datum thickness $T_{1800}$). During the second compression in the second compressing step, compressive strength at datum thickness $T_{1800}$ is measured and found as first measured compressive strength $P_{M1}$ (hereinafter referred to as compressive strength $P_{M1}$). A thickness of the sample at compressive strength $P_{A1}$ of the compression force applied to the sample is measured and found as first measured thickness $T_{M1}$ (hereinafter referred to as thickness $T_{M1}$).

According to the foregoing first inspection condition, first repeated compressive strength ratio $X_1$ (hereinafter referred to as compression ratio $X_1$) is calculated by using the first compression ratio calculating equation, i.e. $X_1=P_{M1}/P_{A1}=P_{M1}/1800$. Then first thickness ratio $Y_1$ (hereinafter referred to as thickness ratio $Y_1$) is calculated by using the first thickness ratio calculating equation, i.e. $Y_1=T_{M1}/T_{1800}$.

Determination based on the compression ratio is done by using the first compression ratio determining exercise, i.e. $X_1 \geq X_{S1}=0.89$. Determination based on the thickness ratio is done by using the first thickness ratio determining exercise, i.e. $Y_1 \geq Y_{S1}=0.98$. Meanwhile first compression ratio threshold value $X_{S1}$ and first thickness threshold value $Y_{S1}$ are obtained from experimental basis, and used as threshold values for determination.

Assume that the second inspection condition is established as follows:
second pretreatment compressive strength $P_{02}$ is set at 300 hPa as pretreatment compressive strength $P_0$;
second load compressive strength $P_{12}$ (hereinafter referred to as compressive strength $P_{12}$) is set at 1013 hPa as load compressive strength $P_1$; and
second reference compressive strength $P_{A2}$ (hereinafter referred to as compressive strength $P_{A2}$) is set at 300 hPa as reference compressive strength $P_A$.

Then during the first compression in the first compressing step, a thickness at compressive strength $P_{A2}=300$ hPa is measured and found as second datum thickness $T_{300}$ (hereinafter referred to as datum thickness $T_{300}$). During the second compression in the second compressing step, compressive strength at datum thickness $T_{300}$ is measured and found as second measured compressive strength $P_{M2}$ (hereinafter referred to as compressive strength $P_{M2}$). A thickness of the sample at compressive strength $P_{A2}$ of the compression force applied to the sample is measured and found as second measured thickness $T_{M2}$ (hereinafter referred to as thickness $T_{M2}$).

According to the foregoing second inspection condition, second repeated compressive strength ratio $X_2$ (hereinafter referred to as compression ratio $X_2$) is calculated by using the second compression ratio calculating equation, i.e. $X_2=P_{M2}/P_{A2}=P_{M2}/300$. Then second thickness ratio $Y_2$ (hereinafter referred to as thickness ratio $Y_2$) is calculated by using the second thickness ratio calculating equation, i.e. $Y_2=T_{M2}/T_{300}$.

Determination based on the compression ratio is done by using the second compression ratio determining exercise, i.e. $X_2 \geq X_{S2}=0.65$. Determination based on the thickness ratio is done by using the second thickness ratio determining exercise, i.e. $Y_2 \geq Y_{S2}=0.90$. Meanwhile second compression ratio threshold value $X_{S2}$ and second thickness threshold value $Y_{S2}$ are obtained from experimental basis, and used as threshold values for determination.

A precision material tester such as "Auto-graph" made by Shimazu Seisakusho Inc. in Japan is used as a repeated compression inspection device for embodying the measurement discussed in the foregoing inspection method. Here is an example of compression test condition:
a compression speed=1 mm/minute or 10 mm/minute
a compressing jig is made of iron and has a cylindrical shape 100 mm across, those jigs are used both in upper and lower side respectively;
a sample size=200×200 mm;
a sample weight=2500 g/m²±15% compressing force is applied to the center of the sample repeatedly for the compressive strength test; and an average of n=3 (sample quantity) is used as compression ratio X and thickness ratio Y respectively.

In the case of using the first inspection condition, approx. equal measurement results can be obtained from the samples, to which not greater than 1500 hPa has been applied, regardless of the presence of vacuum packaging.

When a sample is compressed repeatedly according to the first inspection condition, compression ratio $X_1=0.89$ is a threshold for screening fiber 21. Fibers 21 having compression ratio $X_1$ not smaller than 0.89 are employed in laminated unit 22 of core member 3, which then forms vacuum insulator 2. This structure allows core member 3 to decrease an amount of the heat transferred along the thickness direction (arrow mark C in FIG. 2), so that the heat insulating performance of vacuum insulator 2 can be improved.

In a similar way, when a sample is compressed repeatedly according to the first inspection condition, thickness ratio $Y_1=0.98$ is a threshold for screening fiber 21. Fibers 21 having thickness ratio $Y_1$ not smaller than 0.98 are employed in laminated unit 22 of core member 3, which then forms vacuum insulator 2. This structure allows core member 3 to decrease an amount of the heat transferred along the thickness direction (arrow mark C), so that the heat insulating performance of vacuum insulator 2 can be improved.

When a sample is compressed repeatedly according to the second inspection condition, compression ratio $X_2=0.65$ is a threshold for screening fiber 21. Fibers 21 having compression ratio $X_2$ not smaller than 0.65 are employed in laminated unit 22 of core member 3, which then forms vacuum insulator 2. This structure allows core member 3 to decrease an amount of the heat transferred along the thickness direction (arrow mark C), so that the heat insulating performance of vacuum insulator 2 can be improved.

In a similar way, when a sample is compressed repeatedly according to the second inspection condition, thickness ratio $Y_2=0.90$ is a threshold for screening fiber 21. Fibers 21 having thickness ratio $Y_2$ not smaller than 0.90 are employed in laminated unit 22 of core member 3, which then forms vacuum insulator 2. This structure allows core member 3 to decrease an amount of the heat transferred along the thickness direction (arrow mark C), so that the heat insulating performance of vacuum insulator 2 can be improved.

Selection of the first inspection condition or the second inspection condition depends on various situations of vacuum insulator 2 such as application, environment, material cost and so on. The inspection can be done based on conditions other than the first or the second ones.

Figure 3:
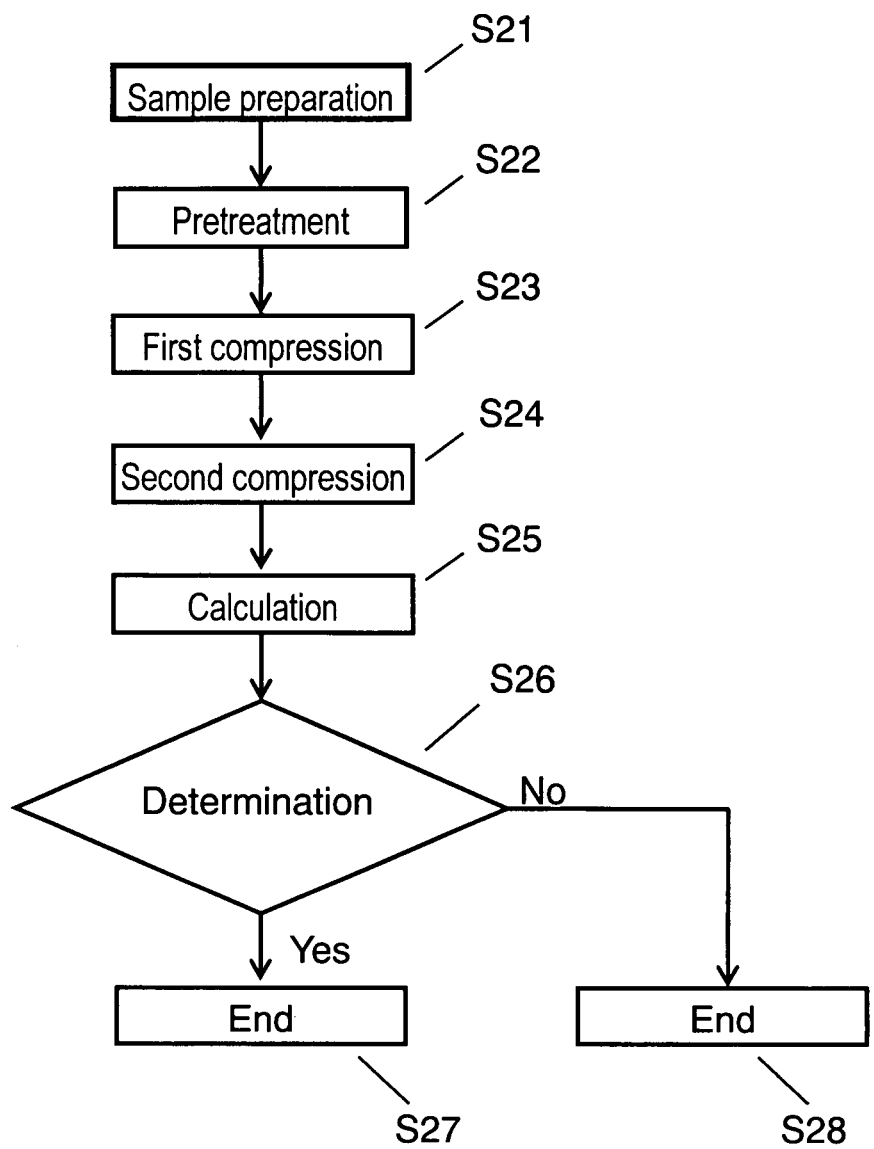
FIG. 3 shows a flowchart illustrating an inspection method of a glass fiber laminated unit to be used in the vacuum insulator shown in FIG. 1.

Use of fibers 21 screened by the inspection method shown in FIG. 3 allows obtaining core member 3 of which resistance to compression is improved. Core member 3 having an improved resistance to compression can thus maintain the heat insulating performance even if its void-ratio is increased, so that core member 3 with a lower density is obtainable by increasing the void-ratio. As a result, vacuum insulator, of which heat insulating performance can be maintained and material cost is lowered, can be obtained.

Characteristic related to the brittleness of fiber 21 has been controlled with tensile strength of fiber 21; however, in actual, each one of fibers 21 has a wide dispersion of fiber strength respectively, so that it has taken a large amount of labor and time for understanding the whole picture of the characteristics about the strength of fibers to be used in laminated unit 22 or core member 3.

The inspection method shown in FIG. 3, however, proves that the compression characteristics of laminated unit 22 or core member 3 can be substituted for the characteristics about the strength of fiber 21. Thus fiber 21 to be used in laminated unit 22 or core member 3 can be controlled with more ease. The whole picture of laminated unit 22 and core member 3 can be realized more specifically, so that the characteristics closer to the actual status can be controlled with ease.

Next, a dispersion of strength of fiber 21 to be used in laminated unit 22 is evaluated by using the compression characteristics used in the inspection method shown in FIG. 3 for glass fiber laminated unit. Compressive strength of glass wool (not shown) with fibers 21 tangled is one of indicators showing a sum of forces of each one of fibers 21 against deformation. In other words, decrease of compressive strength indicates the reduction in fibers 21 that resist against the deformation due to breakage in fibers 21 which are conducive to the compressive strength.

To be more specific, repeated compressive strength ratio X obtained through the inspection method shown in FIG. 3 for the glass fiber laminated unit is found to be in good correlation with the heat conductivity of vacuum insulator 2. On the other hand, compression ratio is set at 2000 hPa in the first inspection condition because of the premise that vacuum insulator 2 will be compressed in order to obtain more flat surface. When insulator 2 is compressed, it is supposed that great pressure, i.e. sum of atmospheric pressure and the compressing force, is applied to fibers 21. Compressive strength $P_{11}$ is thus set at as great as 2000 hPa. Strength $P_{11}$ can be somewhat different from 2000 hPa.

In the first inspection condition, datum thickness $T_{1800}$ is a thickness of laminated unit 22 at compressive strength $P_{A1}=1800$ hPa. In other words, the case where the datum thickness of laminated unit at compressive strength=1800 hPa is established is in good correlation with the heat insulating performance of insulator 2. Compression ratio $X_1$ can be steadily found, so that measurement variations of compression ratio $X_1$ in response to compressive strength $P_A$ can be suppressed.

If laminated unit 22, in which fibers 21 having compression ratio $X_1$ not smaller than 0.89 are used, is compressed up to 2000 hPa, namely, twice as much as the atmospheric pressure, smaller reduction in thickness is found when the compression force is removed. If vacuum insulator 2 is reused from the one having undergone the compressions, it can be excellent in the heat insulating performance.

Core member 3, in which fibers 21 having compression ratio X1 not smaller than 0.89 are used, has smaller heat conductive ratio by 0.0004 W/mK than conventional glass fiber having compression ratio $X_1$ smaller than 0.89.

Core member 3 is measured its compression ratio $X_1$ and found as 0.931. This core member 3 is made of the same material and made by the same method as that of core member 3 of the present invention. Then core member of vacuum insulator 2 is taken out and measured its compression ratio $X_1$. The measurement result shows 0.93 which is substantially equal to 0.931 of the previous core member 3. This small difference can be caused by the dispersion in a sample lot.

In the second inspection condition, compressive strength $P_{12}$ is set at 1013 hPa because of the premise that the atmospheric pressure is always applied to insulator 2 vacuum-packaged. Strength $P_{12}$ can be somewhat different from 1013 hPa. Since the compression force applied to vacuum insulator 2 is equal to the atmospheric pressure, progress of reduction in the brittleness or progress of breakage in the fiber can be suppressed. For this reason and preventing compression ratio $X_2$ from lowering to smaller than 0.65 due to excessive compressive strength $P_{12}$, compressive strength $P_{12}$ is preferably 1013 hPa close to the atmospheric pressure.

In the second inspection condition, datum thickness $T_{300}$ is a thickness of laminated unit 22 at compressive strength $P_{42}=300$ hPa. In other words, the case where the datum thickness of laminated unit at compressive strength=300 hPa is established is in good correlation with the heat insulating performance of insulator 2. Compression ratio $X_2$ can be steadily found, so that measurement variations of compression ratio $X_2$ in response to compressive strength $P_{42}$ can be suppressed.

Core member 3, in which fibers 21 having compression ratio $X_2$ not smaller than 0.65 are used, has smaller heat conductive ratio by 0.0004 W/mK than conventional glass fiber having compression ratio $X_2$ smaller than 0.65.

In the foregoing discussion, laminated unit 22 or core member 3 employing fibers 21 inspected under the first inspection condition or the second inspection condition is described. Vacuum insulator 2, employing fibers 21 which have compression ratio $X_1$ not smaller than 0.89 or $X_2$ not smaller than 0.65, has a smaller density than a conventional vacuum insulator. To be more specific, the conventional one needs 250 kg/m³ as a core member density in order to obtain 10 mm thickness of the insulator, and insulator 2 of the present invention needs only 240 kg/m³ density.

This result tells that fibers 21 of core member 3 are more resistant to be bent or broken than the conventional ones although core member 3 is compressed by the atmospheric pressure, so that voids 24 produced by the tangles in fibers 21 can be maintained and thus the atmospheric pressure can be held with fibers 21 having fewer point contacts.

As a result, the heat amount transferred along the thickness direction (arrow mark C in FIG. 2) of core member 3 can be reduced, so that the heat insulating performance of vacuum insulator 2 can be improved. On top of that, resistance to compression of core member 3 is also improved, so that a void ratio of core member 3 increases, and the density of core member 3 can be lowered, which reduces an amount of fibers 21 by 4%, and thus the material cost can be lowered.

In this first embodiment, fiber 21 to be used in core member 3 employs glass wool which is one of general-purpose industrial materials. The glass wool is toughened by the heat & quench method to be suitable for laminated unit 22 having compression ratio $X_1$ not smaller than 0.89 or $X_2$ not smaller than 0.65.

Fiber 21 to be used in core member 3 can be at least low in brittleness and strong in strength. In the case of using the first inspection condition, fiber 21 preferably has compression ratio $X_1$ not smaller than 0.89, more preferably not smaller than 0.91, and still more preferably not smaller than 0.93. This kind of fiber 21 is desirably used in laminated unit 22.

In the case of using the second inspection condition, fiber 21 has preferably compression ratio $X_2$ not smaller than 0.65, more preferably not smaller than 0.70, and still more preferably not smaller than 0.75. This kind of fiber 21 is desirably used in laminated unit 22.

According to the inspection result using the first inspection condition, the heat conductivity lowers substantially when compression ratio $X_1$ exceeds 0.89; however, no further decrease in the heat conductivity is found when $X_1$ exceeds 0.94. When compression ratio $X_1$ falls within the range of 0.89-0.94, the following correlation is found: the heat conductivity becomes lower at the greater compression ratio $X_1$.

According to the inspection result using the second inspection condition, the heat conductivity lowers substantially when compression ratio $X_2$ exceeds 0.65; however, no further decrease in the heat conductivity is found when $X_2$ exceeds 0.75. When compression ratio $X_2$ falls within the range of 0.65-0.75, the following correlation is found: the heat conductivity becomes lower at the greater compression ratio $X_2$.

Breakage in glass composition, in general, occurs typically in the temperature range from a low temperature to a room temperature, and it is brittle fracture which abruptly occurs at a critical stress. Such breakage in brittle solid is produced by separation of atoms because tensile stress cuts inter-atomic bonds.

However, numerous large and small flaws called Griffith flaws actually exist on the surface and inside of the glass, so that stress is concentrated on these Griffith flaws and the glass is thus broken by load stress far below the theoretical value. This is one of the causes why the glass is so brittle.

In the case of using the glass fiber, to strengthen fiber 21 and to make the glass per se low brittle can prevent fiber 21 from being broken by load stress such as compression. If numerous fibers 21 remain free from breakage due to compression by the atmospheric pressure, voids 24 around fibers 21 can be maintained, so that surrounding fibers 21 are difficult to touch to each other. Breakage of fibers 21 produce free ends of the fibers, and the free ends touch to surrounding fibers 21, thereby increasing an amount of the heat to be transferred; however, since numerous fibers 21 remain unbroken, the increase of heat transfer can be suppressed. As a result, the heat transfer through solid component of the glass is suppressed, and vacuum insulator 2, in which heat transfer through the solid component is reduced, is obtainable.

EXPERIMENTS

Laminated unit 22 and core member 3 undergo the repeated compression test, and the characteristics are measured. Various glass fibers are used for forming laminated unit 22 and core member 3 for this test. Specific experiments and comparative examples will describe the measurement result hereinafter.

Table 1 shows the relation between repeated compressive strength ratio $X_1$ and thickness ratio $Y_1$ under the condition that both of a method of reinforcing the glass of fiber 21 and a glass composition are varied. Ratio $X_1$ and ratio $Y_1$ are used in the repeated compression test where the first inspection condition is adopted. Table 1 further shows the relation between the heat conductivity and the density of vacuum insulator 2. Table 1 shows experiments 1-7 of the present invention as well as comparative examples 1 and 2 based on the conventional vacuum insulators.

TABLE 1

|  |  |  | experiments | | | | | | | comparison | |
|---|---|---|---|---|---|---|---|---|---|---|---|
|  |  |  | 1 | 2 | 3 | 4 | 5 | 6 | 7 | 1 | 2 |
| Glass composition | | | A | A | A | A | A | B | A | A | C |
| Method of reinforcing the glass | | | quench (30° C.) | quench (30° C.) | quench (10° C.) | Hydrofluoric acid process | Ion exchange process | N/A | quench (10° C.) | N/A | N/A |
| Repeated compression test result | Compression strength ratio $X_1$ | Load compression strength $P_{11}$ (hPa) | 1800 | 1800 | 1800 | 1800 | 1800 | 1800 | 1800 | 1800 | 1800 |
| | | Measured compression strength $P_{M1}$ (hPa) | 1638 | 1674 | 1692 | 1692 | 1694 | 1688 | 1638 | 1584 | 1494 |
| | | $P_{M1}/1800$ | 0.91 | 0.93 | 0.94 | 0.94 | 0.941 | 0.938 | 0.91 | 0.88 | 0.83 |
| | thickness ratio $Y_1$ | Datum thickness $T_{1800}$ (mm) | 8.37 | 8.21 | 8.35 | 8.01 | 7.96 | 8.11 | 8.51 | 7.81 | 7.11 |
| | | Measured thickness $T_{M1}$ (mm) | 8.22 | 8.10 | 8.26 | 7.91 | 7.87 | 8.01 | 8.36 | 7.61 | 6.69 |
| | | $T_{M1}/T_{1800}$ | 0.982 | 0.986 | 0.989 | 0.988 | 0.989 | 0.988 | 0.982 | 0.975 | 0.941 |
| vacuum insulator properties | Heat conductivity (W/mK) | | 0.0016 | 0.0015 | 0.0015 | 0.0014 | 0.0014 | 0.0014 | 0.0017 | 0.0019 | 0.0022 |
| | Core member density (kg/m³) | | 245 | 240 | 240 | 240 | 240 | 235 | 225 | 250 | 280 |

Glass compositions A, B, and C are used in fiber 21. Glass composition A is soda-lime glass (generally called C glass), glass composition B is alkali-free glass (generally called E glass), and glass composition C is soda-lime glass having two times alkaline and barium oxide in quantity of 5 mol % is added thereto. In glass composition C, silicon oxide is reduced by the amount corresponding to the increased amount of alkali and barium oxide.

The soda-lime glass having glass composition A and used in the experiments is tempered by a heat & quench method (marked with "quench" in table 1), chemical tempering method using fluoride oxygen (the method is also called as fluoride oxygen process), or an ion-exchange method (another name is ion-exchange process).

The repeated compression ratio and the thickness ratio are measured using n=3 (quantity of samples) respectively based on the inspection method shown in FIG. 3, and the average measurements are listed in table 1. In the space for compressive strength ratio, compression ratio $X_1$ is put, and in the space for thickness ratio, thickness ratio $Y_1$ is put. The heat conductivity is measured with "Auto A" made by Eiko Seiki at average temperature 24° C., and the result is put in table 1.

In measuring the compression ratio $X_1$ and thickness ratio $Y_1$ of core member 3, vacuum insulator 2 is subdivided for taking out core material 3, which is then used as a sample. This procedure prevents vacuum insulator 2 from lowering its heat conductivity, because the compression test possibly gives adverse affect to core member 3.

Experiments 1

Fiber 21 used in experiment 1 employs soda-lime glass of which main ingredient is glass cullet, a popular ingredient of glass composition A. Since fiber 21 is toughened its mechanical strength by the heat & quench method, the mechanical characteristics of fiber 21 are strong and low brittle. The quenching condition is 30° C. air temperature.

In experiment 1, compression ratio $X_1$ shows 0.91 and thickness ratio $Y_1$ shows 0.982. The heat conductivity of vacuum insulator 2 is 0.0016 W/mK, which improves from the conventional one by 0.0003 W/mK. The core member density of vacuum insulator 2 is 245 kg/m³, which lowers from the conventional one (250 kg/m³) by 2%.

Samples of core member 3 are prepared in the quantity of twice as many as those of vacuum insulator 2. A half of the samples of core member 3 are vacuum-packaged, and the other half are not vacuum-packaged before they undergo the repeated compression test. The test without vacuum package tells that compression ratio $X_1=0.91$ and thickness ratio $Y_1=0.981$. The slight difference in thickness ratio $Y_1$ is found between "with vacuum package" and "without vacuum package"; however, this slight difference can be the dispersion in the sample lot.

The repeated compression test thus results in approx. equal values regardless of the presence of vacuum package. This test result tells that compression records have been unified in the pretreatment process of the inspection.

The background of this test result can be this: fiber 21 is difficult to be distorted or broken when it is compressed by the atmospheric pressure comparing with the conventional one, so that voids 24 formed by tangling fibers 21 with each other are maintained. Fibers 21 thus can bear the atmospheric pressure with a fewer quantity of contact points between fibers 21. As a result, the amount of heat transfer along the thickness direction of core member 3 (arrow mark C in FIG. 2) is reduced, so that the heat insulating performance of vacuum insulator 2 is improved. On top of that, core member 3 improves its resistance to compression, so that the void-ratio of core member 3 increases, which allows core member 3 to lower its density.

Experiment 2

Fiber 21 used in experiment 2 is made of the same material and undergoes the same reinforcing method as that used in experiment 1. The air temperature in quenching is also the same, i.e. 30° C. Compression rate $X_1=0.93$ and thickness ratio $Y_1=0.986$ are obtained in this experiment 2. The heat conductivity of vacuum insulator 2 is 0.0015 W/mK, which improves from the conventional one by 0.0004 W/mK. The core member density of vacuum insulator 2 is 240 kg/m$^3$, which lowers from the conventional one (250 kg/m$^3$) by 4%. The foregoing result can be obtained due to the action and advantage similar to those described in experiment 1.

Experiment 3

Fiber 21 used in experiment 3 is made of the same material and undergoes the same reinforcing method as that used in experiments 1 and 2. The air temperature in quenching fiber 21 is set at 10° C. which is lower than the condition in experiments 1 and 2 by 20° C. Compression ratio $X_1=0.94$ and thickness ratio $Y_1=0.989$ are obtained. These ratios are somewhat greater than those obtained in experiments 1 and 2, because the quenching air temperature is lowered from 30° C. to 10° C. This condition increases the effect of quench hardening more conspicuously on the surface of fiber 21. The heat conductivity of vacuum insulator 2 is 0.0015 W/mK, which improves from the conventional one by 0.0004 W/mK. The core member density of vacuum insulator 2 is 240 kg/m$^3$, which lowers from the conventional one (250 kg/m$^3$) by 4%. The foregoing result can be obtained due to the action and advantage similar to those described in experiments 1 and 2.

Experiment 4

Fiber 21 used in experiment 4 is made of the same material as those used in experiments 1, 2, and 3. Since this fiber 21 is toughened its mechanical strength by the chemical strengthening method using fluoride oxygen, it gains highly strong and low brittle mechanical characteristics. Compression ratio $X_i=0.94$ and thickness ratio $Y_1=0.988$ are obtained in this experience. This result is the same as that obtained in experiment 3 at air temperature 10° C. in quenching. The heat conductivity of vacuum insulator 2 is 0.0014 W/mK, which improves from the conventional one by 0.0005 W/mK. The core member density of vacuum insulator 2 is 240 kg/m$^3$, which lowers from the conventional one (250 kg/m$^3$) by 4%. The foregoing result can be obtained due to the action and advantage similar to those described in experiments 1-3.

Experiment 5

Fiber 21 used in experiment 5 is made of the same material as those used in experiments 1-4. Since this fiber 21 is toughened its mechanical strength by the ion exchange method, it gains highly strong and low brittle mechanical characteristics. Compression ratio $X_1=0.941$ and thickness ratio $Y_1=0.989$ are obtained in experiment 5. This result somewhat increases from the one using the heat & quench method because the ion exchange method is more effective than the heat & quench method. The heat conductivity of vacuum insulator 2 is 0.0014 W/mK, which improves from the conventional one by 0.0005 W/mK. The core member density of vacuum insulator 2 is 240 kg/m$^3$, which lowers from the conventional one (250 kg/m$^3$) by 4%. The foregoing resultant improvement can be obtained due to the action and advantage similar to those described in experiments 1-4.

Experiment 6

Fiber 21 used in experiment 6 employs alkali-free glass, i.e. E-glass, having glass composition B. The composition of E-glass has Young's modulus higher than that of soda-lime glass by approx. 10%, so that fiber 21 used in experiment 6 increases its tensile strength. Compression ratio $X_1=0.938$ and thickness ratio $Y_1=0.988$ are obtained in experiment 6. The heat conductivity of vacuum insulator 2 is 0.0014 W/mK, which improves from the conventional one by 0.0005 W/mK. The core member density of vacuum insulator 2 is 235 kg/m$^3$, which lowers from the conventional one (250 kg/m$^3$) by 6%.

The background of this test result can be this: fiber 21 is difficult to be distorted or broken when it is compressed by the atmospheric pressure comparing with the conventional one, so that voids 24 formed by tangling fibers 21 with each other are maintained. Fibers 21 thus can bear the atmospheric pressure with a fewer quantity of contact points between fibers 21. As a result, the amount of heat transfer along the thickness direction of core member 3 is reduced, so that the heat insulating performance of vacuum insulator 2 is improved. On top of that, core member 3 improves its resistance to compression, so that the void-ratio of core member 3 increases, which allows core member 3 to lower its density. The foregoing result tells that the change in glass composition can improve the heat insulating performance.

Experiment 7

Fiber 21 made of the same material and by the same method as experiment 3 is used in this experiment 7. In addition, phenolic resin is applied as binder to laminated unit 22 for producing core member 3. Compression ratio $X_1=0.91$ and thickness ratio $Y_1=0.982$ are obtained in experiment 7. The heat conductivity of vacuum insulator 2 is 0.0017 W/mK, which improves from the conventional one by 0.0002 W/mK. The core member density of vacuum insulator 2 is 225 kg/m$^3$, which lowers from the conventional one (250 kg/m$^3$) by 10%. This result tells that the action of phenolic resin fixes the relative position of fiber 21, thereby increasing the rigidity of core member 3 as a whole.

Comparative Example 1

A core material employs glass fiber formed of regular soda-lime glass, and the fiberglass has not undergone any special treatment, so that it can be said that conventional glass fiber having general physical properties is used. The comparative example 1 results in compression ratio $X_1=0.88$ and thickness ratio $Y_1=0.975$. The heat conductivity of vacuum insulator 2 is 0.0019 W/mK, and core member density of vacuum insulator 2 is 250 kg/m$^3$.

Comparative Example 2

A core member employs glass fiber having glass composition C, and the glass fiber has not undergone any special treatment, so that it is fiberized by a regular method. The comparative example 2 results in compression ratio $X_1=0.83$ and thickness ratio $Y_1=0.941$. The heat conductivity of vacuum insulator 2 is 0.0022 W/mK, which is worse than the conventional one by 0.0003 W/mK. The core member density of vacuum insulator 2 is 280 kg/m$^3$, which increases from the conventional one 250 kg/m$^3$.

The foregoing discussion describes table 1, and as table 1 tells, the heat conductivity lowers at the greater compression ratio $X_1$, so that it can be concluded that compression ratio $X_1$ does not depend on the production method of fiber 21 to be used in laminated unit 22 or core member 3.

Next, table 2 shows the relation between repeated compressive strength ratio $X_2$ and thickness ratio $Y_2$ under the condition that both of a method of reinforcing glass of fiber 21 and glass composition are varied. Ratio $X_2$ and ratio $Y_2$ are used in the repeated compression test where the second inspection condition is adopted. Table 2 further shows the relation between the heat conductivity and the density of vacuum insulator 2. Table 2 shows experiment 8-13 of the present invention as well as comparative examples 3 and 4 based on conventional vacuum insulators.

mance of vacuum insulator 2 is improved. On top of that, core member 3 improves its resistance to compression, so that the void-ratio of core member 3 increases, which allows core member 3 to lower its density.

Experiment 9

Fiber 21 used in experiment 9 is made of the same material and undergoes the same reinforcing method as that used in experiment 8. The air temperature in quenching is

TABLE 2

|  |  |  | experiments | | | | | | comparison | |
| --- | --- | --- | --- | --- | --- | --- | --- | --- | --- | --- |
|  |  |  | 8 | 9 | 10 | 11 | 12 | 13 | 3 | 4 |
| Glass composition | | | A | A | A | A | A | B | A | C |
| Method of reinforcing the glass | | | quench (30° C.) | quench (30° C.) | quench (10° C.) | Hydrofluoric acid process | Ion exchange process | N/A | N/A | N/A |
| Repeated compression test result | Compression strength ratio $X_2$ | Load compression strength $P_{12}$ (hPa) | 300 | 300 | 300 | 300 | 300 | 300 | 300 | 300 |
| | | Measured compression strength $P_{M2}$ (hPa) | 195 | 210 | 252 | 255 | 270 | 240 | 189 | 150 |
| | | $P_{M2}/300$ | 0.65 | 0.75 | 0.84 | 0.85 | 0.90 | 0.80 | 0.63 | 0.50 |
| | thickness ratio $Y_2$ | Datum thickness $T_{300}$ (mm) | 16.0 | 15.3 | 14.9 | 15.9 | 15.5 | 14.8 | 15.6 | 15.1 |
| | | Measured thickness $T_{M2}$ (mm) | 14.5 | 14.0 | 13.9 | 14.8 | 14.6 | 13.8 | 14.0 | 13.3 |
| | | $T_{M2}/T_{300}$ | 0.905 | 0.915 | 0.930 | 0.931 | 0.942 | 0.930 | 0.895 | 0.880 |
| Vacuum insulator properties | Heat conductivity (W/mK) | | 0.0016 | 0.0015 | 0.0015 | 0.0014 | 0.0014 | 0.0014 | 0.0019 | 0.0022 |
| | Core member density (kg/m³) | | 245 | 240 | 240 | 240 | 240 | 235 | 250 | 280 |

The glass composition and toughening method listed in table 2 are the same as those listed in table 1, and the measuring methods of the heat conductivity and the core member density are the same as those used in table 1. The repeated compression ratio and thickness ratio are measured using n = 3 (quantity of samples) respectively based on the inspection method shown in FIG. 3, and the average measurements are listed in table 1. In the space for compressive strength ratio, compression ratio $X_2$ is put, and in the space for thickness ratio, thickness ratio $Y_2$ is put.

Experiment 8

Fiber 21 used in experiment 8 employs soda-lime glass of which main ingredient is glass cullet, a popular ingredient of glass composition A. Since fiber 21 is toughened its mechanical strength by the heat & quench method, the characteristics of fiber 21 are strong in mechanical strength and low in brittleness. The quenching condition is 30° C. air temperature. Experiment 8 results in compression ratio $X_2$ =0.65 and thickness ratio $Y_2$ =0.905. The heat conductivity of vacuum insulator 2 is 0.0016 W/mK, which improves from the conventional one by 0.0003 W/mK. The core member density of vacuum insulator 2 is 245 kg/m³, which lowers from the conventional one (250 kg/m³) by 2%.

The background of this test result can be this: fiber 21 is difficult to be distorted or broken when it is compressed by the atmospheric pressure comparing with the conventional one, so that voids 24 formed by tangling fibers 21 with each other are maintained. Fibers 21 thus can bear the atmospheric pressure with a fewer quantity of contact points between fibers 21. As a result, the amount of heat transfer along the thickness direction of core member 3 (arrow mark C in FIG. 2) is reduced, so that the heat insulating perforalso the same, i.e. 30° C. Experiment 9 results in compression rate $X_2$=0.75 and thickness ratio $Y_2$=0.915 are obtained in this experiment 9. The heat conductivity of vacuum insulator 2 is 0.0015 W/mK, which improves from the conventional one by 0.0004 W/mK. The core member density of vacuum insulator 2 is 240 kg/m³, which lowers from the conventional one (250 kg/m³) by 4%. The foregoing result can be obtained due to the action and advantage similar to those described in experiment 8.

Experiment 10

Fiber 21 used in experiment 10 is made of the same material and undergoes the same reinforcing method as that used in experiments 8 and 9. The air temperature in quenching fiber 21 is set at 10° C. which is lower than the condition in experiments 8 and 9 by 20° C. Compression ratio $X_2$=0.84 and thickness ratio $Y_2$=0.930 are obtained. These ratios are somewhat greater than those obtained in experiments 8 and 9, because the quenching air temperature is lowered from 30° C. to 10° C. This condition increases the effect of quench hardening more conspicuously on the surface of fiber 21. The heat conductivity of vacuum insulator 2 is 0.0015 W/mK, which improves from the conventional one by 0.0004 W/mK. The core member density of vacuum insulator 2 is 240 kg/m³, which lowers from the conventional one (250 kg/m³) by 4%. The foregoing result can be obtained due to the action and advantage similar to those described in experiments 8 and 9.

Experiment 11

Fiber 21 used in experiment 11 is made of the same material as those used in experiments 8, 9, and 10. Since this fiber 21 is toughened its mechanical strength by the chemical strengthening method using fluoride oxygen, it gains highly strong and low brittle mechanical characteristics. Compression ratio $X_2$ =0.85 and thickness ratio $Y_2$ =0.931 are obtained in this experience. This result is the same as that obtained in experiment 10 at air temperature 10° C. in quenching. The heat conductivity of vacuum insulator 2 is 0.0014 W/mK, which improves from the conventional one by 0.0005 W/mK. The core member density of vacuum insulator 2 is 240 kg/m³, which lowers from the conventional one (250 kg/m³) by 4%. The foregoing result can be obtained due to the action and advantage similar to those described in experiments 8-10.

Experiment 12

Fiber 21 used in experiment 12 is made of the same material as those used in experiments 8-11. Since this fiber 21 is toughened its mechanical strength by the ion exchange method, it gains highly strong and low brittle mechanical characteristics. Compression ratio $X_2$ =0.90 and thickness ratio $Y_2$ =0.942 are obtained in experiment 12. This result somewhat increases from the one using the heat & quench method because the ion exchange method is more effective than the heat & quench method. The heat conductivity of vacuum insulator 2 is 0.0014 W/mK, which improves from the conventional one by 0.0005 W/mK. The core member density of vacuum insulator 2 is 240 kg/m³, which lowers from the conventional one (250 kg/m³) by 4%. The foregoing resultant improvement can be obtained due to the action and advantage similar to those described in experiments 8-11.

Experiment 13

Fiber 21 used in experiment 13 employs alkali-free glass, i.e. E-glass, having glass composition B. The composition of E-glass has Young's modulus higher than that of soda-lime glass by approx. 10%, so that fiber 21 used in experiment 13 increases its tensile strength. Compression ratio $X_2$=0.80 and thickness ratio $Y_2$=0.930 are obtained in experiment 13. The heat conductivity of vacuum insulator 2 is 0.0014 W/mK, which improves from the conventional one by 0.0005 W/mK. The core member density of vacuum insulator 2 is 235 kg/m³, which lowers from the conventional one (250 kg/m³) by 6%.

The background of this test result can be this: fiber 21 is hard to be distorted or broken when it is compressed by the atmospheric pressure comparing with the conventional one, so that voids 24 formed by tangling fibers 21 with each other are maintained. Fibers 21 thus can bear the atmospheric pressure with a fewer quantity of contact points between fibers 21. As a result, the amount of heat transfer along the thickness direction of core member 3 is reduced, so that the heat insulating performance of vacuum insulator 2 is improved. On top of that, core member 3 improves its resistance to compression, so that the void-ratio of core member 3 increases, which allows core member 3 to lower its density. The foregoing result tells that the change in glass composition can improve the heat insulating performance.

Comparative Example 3

A core material employs glass fiber formed of regular soda-lime glass, and the fiberglass has not undergone any special treatment, so that it can be said that conventional glass fiber having general physical properties is used. The comparative example 3 results in compression ratio $X_2$=0.63 and thickness ratio $Y_2$=0.895. The heat conductivity of vacuum insulator 2 is 0.0019 W/mK, and core member density of vacuum insulator 2 is 250 kg/m³.

Comparative Example 4

A core member employs glass fiber having glass composition C, and the glass fiber has not undergone any special treatment, so that it is fiberized by a regular method. The comparative example 4 results in compression ratio $X_2$=0.50 and thickness ratio $Y_2$=0.880. The heat conductivity of vacuum insulator 2 is 0.0022 W/mK, which is worse than the conventional one by 0.0003 W/mK. The core member density of vacuum insulator 2 is 280 kg/m³, which increases from the conventional one 250 kg/m³. As table 2 tells, the heat conductivity lowers at the greater compression ratio $X_2$, so that it can be concluded that compression ratio $X_2$ does not depend on the production method of fiber 21 to be used in laminated unit 22 or core member 3.

Exemplary Embodiment 2

Figure 4:
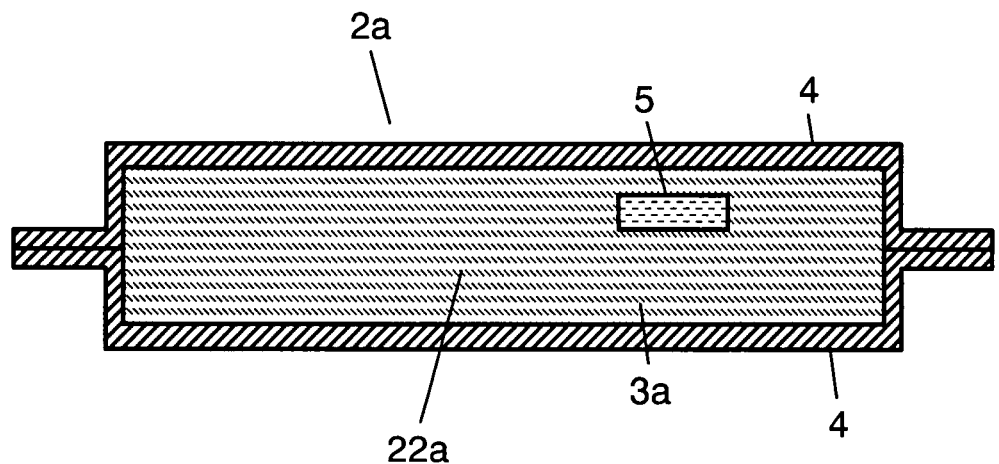
FIG. 4 shows a sectional view of a vacuum insulator in accordance with a second embodiment of the present invention.

FIG. 4 shows a sectional view of a vacuum insulator in accordance with the second embodiment of the present invention. In FIG. 4, vacuum insulator 2a is formed by inserting core member 3a and adsorbent 5 into jacket 4 of which interior is decompressed. Core member 3a is adjusted such that a thickness of vacuum insulator 2a becomes 10 mm.

Core member 3a is formed by laminating glass wool made of web 23 using glass fibers 21 up to a given thickness. Laminated unit 22a is formed by coupling webs 23 to each other with tangles in fibers 21. Laminated unit 22a is directly used as core member 3a, in other words, core member 3a is not formed into a plate-like shape with binder or by the heat forming method.

Vacuum insulator 2a in accordance with the second embodiment is made of similar materials and formed by a similar method to those in the first embodiment except the manufacturing method of core member 3a. Fiber 21 to be used in core member 3a is glass wool having an average diameter of 3.5 µm, and core member 3a has compression ratio $X_1$=0.93 and compression ratio $X_2$=0.80.

Vacuum insulator 2a thus produced has heat conductivity as low as 0.0014 W/mK at average temperature 24° C. This excellent heat conductivity is lower than the conventional one by 0.0005 W/mK. The conventional vacuum insulator employs the glass fiber of which compression ratio $X_1$ is less than 0.89, and compression ratio $X_2$ is less than 0.65.

Comparing with the first embodiment, although laminated unit 22a has compression ratio $X_1$ approx. equal to compression ratio $X_2$, vacuum insulator 2a shows better heat insulating performance. Although the conventional vacuum insulator uses a core member density of 250 kg/m³ in order to make the insulator 10 mm thick, vacuum insulator 2a uses a core member density of 235 kg/m³.

The background of this test result can be this: fiber 21 is difficult to be distorted or broken when it is compressed by the atmospheric pressure comparing with the conventional one, so that voids 24 formed by tangling fibers 21 with each other are maintained. Fibers 21 thus can bear the atmospheric pressure with a fewer quantity of contact points between fibers 21. As a result, the amount of heat transfer along the thickness direction of core member 3a is reduced, so that the heat insulating performance of vacuum insulator 2a is improved. On top of that, core member 3a improves its resistance to compression, so that the void-ratio of core member 3a increases, which allows core member 3a to lower its density. The amount of fibers 21 can be thus reduced by 6%, and the material cost can be lowered.

As discussed above, use of core member 3a which is not shaped like a plate allows obtaining vacuum insulator 2a excellent in heat insulating performance due to similar action and advantage described in the first embodiment. Since core member 3a needs no plate-forming step before being formed into vacuum insulator 2a, the cost of insulator 2a can be lowered. Fiber 21 to be used for improving the heat insulating performance of insulator 2a preferably has a low compression ratio at the repeated compression.

Exemplary Embodiment 3

Figure 5:
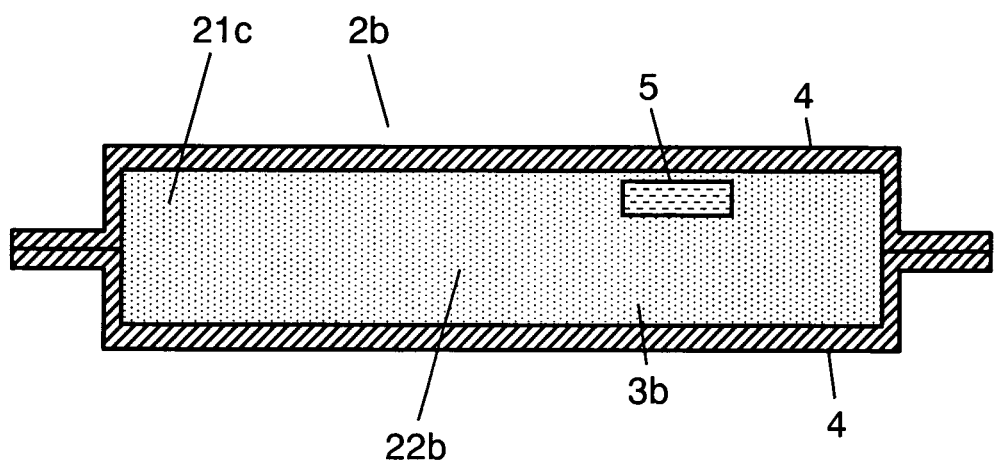
FIG. 5 shows a sectional view of a vacuum insulator in accordance with a third embodiment of the present invention.

FIG. 5 shows a sectional view of a vacuum insulator in accordance with the third embodiment of the present invention. In FIG. 5, vacuum insulator 2b is formed by inserting core member 3b and adsorbent 5 into jacket 4 of which interior is decompressed. Core member 3b is adjusted such that a thickness of vacuum insulator 2b becomes 10 mm.

Core member 3b employs glass wool as glass fiber 21c (hereinafter referred to as fiber 21c), and phenolic resin is applied as binder (not shown) to fiber 21c, so that laminated unit 22 as a whole increases its rigidity, and it can be handled with more ease. Vacuum insulator 2b in accordance with this third embodiment is made of similar materials and formed by a similar method to those of vacuum insulator 2 described in the first embodiment except the manufacturing method of core member 3b.

Vacuum insulator 2b thus produced has heat conductivity as 0.0017 W/mK at average temperature 24° C. This is higher by 0.0002 W/mK than that of the vacuum insulator, of which core member is produced without using the binder. This fact tells that the phenolic resin acts on the contact points between fibers 21c of laminated unit 22b for increasing the heat transfer. Compression ratio $X_1$ of core member 3b is 0.91 which is lower by 0.02 than that of the core member produced without using the binder. The background of this fact can be estimated as follows: The first compression in the first compressing step breaks fibers 21c, and phenolic resin removes from fibers 21c, so that one of factors conducive to the second compression in the second compressing step is eliminated.

On the other hand, the density of vacuum insulator 2b is 225 kg/m³, which tells that phenolic resin acts on fibers 21c so that fibers 21c becomes difficult to change its relative position. Vacuum insulator 2b thus becomes difficult to be compressed by the atmospheric pressure. As a result, vacuum insulator 2b used in this third embodiment allows using fibers 21c in a fewer amount by 10% and the material cost can be also lowered.

Since core member 3b is formed into a plate-like shape by using the binder, even if the glass fiber is impossible to be heat-formed, it can be shaped like a plate, so that vacuum insulator excellent in heat insulating performance is obtainable with ease.

Exemplary Embodiment 4

Figure 6:
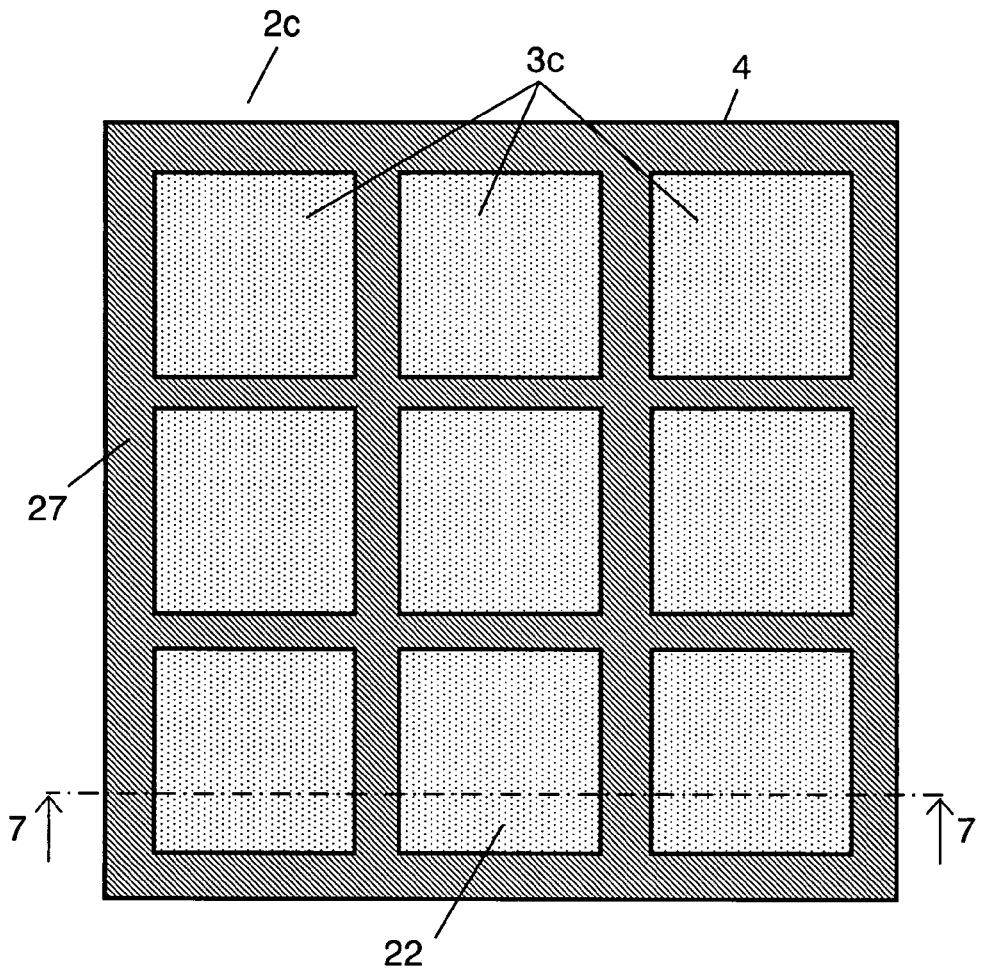
FIG. 6 shows a schematic plan view of a vacuum insulator in accordance with a fourth embodiment of the present invention.
Figure 7:
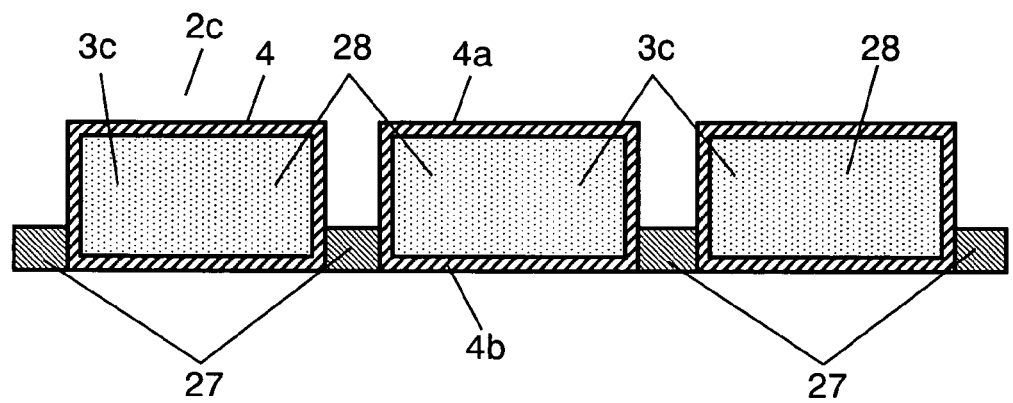
FIG. 7 shows a schematic sectional view taken along line 7-7 in FIG. 6.
Figure 8:
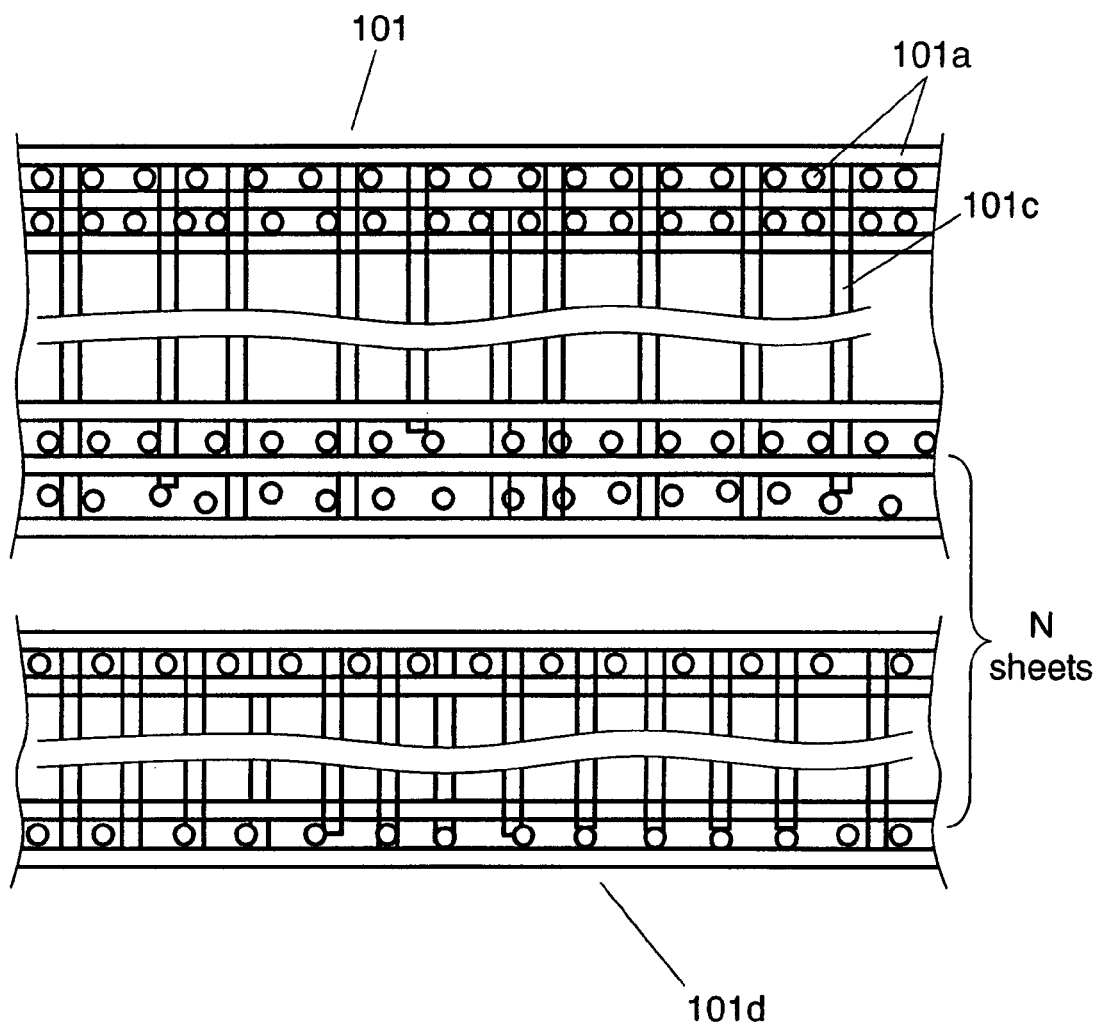
FIG. 8 shows a schematic sectional view of a core member used in a conventional vacuum insulator.

FIG. 6 shows a schematic plan view of a vacuum insulator in accordance with the fourth embodiment of the present invention. FIG. 7 shows a schematic sectional view taken along line 7-7 in FIG. 6. In FIG. 6, a plurality of core members 3c of vacuum insulator 2c are decompressed and sealed by jacket 4 which has high gas-barrier properties, and they are divided into independent vacuum spaces 28 by thermal welding sections 27. Jacket 4 is formed of upper film 4a and lower film 4b in pair confronting each other. Both of films 4a and 4b are made of plastic laminated film.

Vacuum insulator 2c is produced this way: First, upper and lower films 4a and 4b are prepared in a vacuum chamber. A plurality of core members 3c are fixed on the top face of lower film 4b in advance by a known method such as thermal welding, and these core members 3c have been dried for 20 minutes at 140° C. Then decompression is done so that surroundings of core members 3c become not greater than 10 Pa, and upper and lower films 4a and 4b preheated are thermally welded together with core members 3c. Films 4a and 4b confronting each other extending near to the surroundings of respective core members 3c are thermally welded, so that thermal welded sections 27 are formed. Core members 3c are thus divided into independent vacuum spaces 28.

Vacuum insulator 2c in accordance with this fourth embodiment is made of materials similar to those of vacuum insulators 2, 2a and 2b demonstrated in embodiments 1-3, although insulator 2c is produced by a different method from those of other insulators 2, 2a and 2b. Insulator 2c however uses no water adsorbent. The properties of core member 3c such as a thickness, density are adjusted so that insulator 2c becomes 5 mm thick.

Fiber 21 used in core member 3c is glass wool of which average diameter is 3.5 μm. Laminated unit 22 has compression ratio $X_1$=0.932 and $X_2$=0.76. Vacuum insulator 2c thus produced has heat conductivity of 0.0015 W/mK at average temperature 24° C. This excellent heat conductivity is lower than the conventional one by 0.0004 W/mK. A core member density of conventional vacuum insulator is 250 kg/m³ in order to make the insulator 5 mm thick; however, that of insulator 2c can be as low as 240 kg/m³.

The background of this test result can be this: fiber 21 is difficult to be distorted or broken when it is compressed by the atmospheric pressure comparing with the conventional one, so that voids 24 formed by tangling fibers 21 with each other are maintained. Fibers 21 thus can bear the atmospheric pressure with a fewer quantity of contact points between fibers 21. As a result, the amount of heat transfer along the thickness direction of core member 3c is reduced, so that the heat insulating performance of vacuum insulator 2c is improved. On top of that, core member 3c improves its resistance to compression, so that the void-ratio of core member 3c increases, which allows core member 3c to lower its density. The amount of fibers 21 can be thus reduced by 4%, and the material cost can be lowered.

INDUSTRIAL APPLICABILITY

A vacuum insulator of the present invention is excellent in heat insulating performance, so that it gains high heat-insulating capability with a thinner structure. It can be used not only in cooling or heat insulating devices such as refrigerators, cooler boxes but also in LCD projectors, copying machines, notebook computers which require a heat insulator exerting higher heat insulating performance at a smaller space.

The invention claimed is:

1. A vacuum insulator comprising:
   a core member comprising a laminated unit formed of glass fiber webs, glass fibers forming the glass fiber webs having low brittleness; and
   a jacket having a decompressed interior and covering the core member, wherein:

the core member is formed with no binder, and the core member has a brittleness property B of 0.89 or more, where the brittleness property B is measured such that, when a compressive strength of the core member reaches 1800 hPa in a first compression step, a thickness of the core member is set as first datum thickness $T_{1800}$, and when a thickness of the core member reaches the first datum thickness $T_{1800}$ in a second compression step, a ratio of a compressive strength of the core member in the second compression step to 1800 hPa is defined as the brittleness property B.

2. The vacuum insulator of claim 1, wherein the core member is constructed by forming the laminated unit into a plate shape.

3. The vacuum insulator of claim 2, wherein the core member is constructed by heat forming the laminated unit into a plate shape.

4. The vacuum insulator of claim 1, wherein the core member is compressed by a compressive strength of 2000 hPa, then the compressive is removed, and the core member undergoes this compression and removal repeatedly, wherein when a compressive strength of the core member reaches 1800 hPa in a first compression step, a thickness of the core member is measured as first datum thickness $T_{1800}$, wherein when a compressive strength applied to the core member reaches 1800 hPa in a second compression step, a thickness of the core member is set as first measured thickness $T_{M1}$, wherein first thickness ratio $Y_1$ is expressed as $$Y_1 = T_{M1}/T_{1800} \geq 0.98.$$

5. The vacuum insulator of claim 1, wherein the glass fibers are toughened glass fibers toughened by a chemical strengthening method.

6. The vacuum insulator of claim 1, wherein the glass fibers are toughened glass fibers toughened by an ion exchange method.

7. The vacuum insulator of claim 1, wherein the glass fibers are toughened glass fibers toughened by cool air blasting immediately after the glass fiber is fiberized.

8. The vacuum insulator of claim 1, wherein immediately after the fiber is fiberized, cooled air blasted to the fiber, so that the fiber structure is quenched and toughened so that the core member has the brittleness property when, the core member is compressed by a compressive strength of 2000 hPa, then the compressive is removed, and the core member undergoes this compression and removal repeatedly.

9. The vacuum insulator of claim 1, wherein the glass fiber web is formed of first glass fibers disposed substantially in parallel with a cross section of the core member and second glass fibers disposed substantially in a vertical direction with respect to the cross section of the core member.

10. The vacuum insulator of claim 1, further comprising an adsorbent covered by the jacket.

11. The vacuum insulator of claim 1, wherein each of the glass fibers has a tensile strength of not lower than 0.5 GPa.

12. The vacuum insulator of claim 1, wherein a density of the core member is between 225 kg/m$^3$ and 245 kg/m$^3$.

13. A vacuum insulator comprising:

a core member comprising a laminated unit formed of glass fiber webs, glass fibers forming the glass fiber webs having low brittleness; and a jacket having a decompressed interior and covering the core member, wherein:

the core member is formed with no binder, the core member has a brittleness property B of 0.89 or more, where the brittleness property B is measured such that, when a compressive strength of the core member reaches 1800 hPa in a first compression step, a thickness of the core member is set as first datum thickness $T_{1800}$, and when a thickness of the core member reaches the first datum thickness $T_{1800}$ in a second compression step, a ratio of a compressive strength of the core member in the second compression step to 1800 hPa is defined as the brittleness property B, and the glass fibers are toughened such that the laminated unit has the brittleness property B of 0.89 or more, by at least one method of:

a chemical strengthening method by which Griffith flaws at surfaces of the glass fibers are removed by using a hydrofluoric acid;

an ion exchange method by which Na ions on surfaces of the glass fibers are replaced with K ions, thereby forming a layer having higher compressive stress on the surfaces of the glass fibers than inside the glass fibers; and an air-blast quench method by blasting a cool air immediately after the glass fibers are fiberized, thereby forming a layer having higher compressive stress on the surfaces of the glass fibers than inside the glass fibers.

* * * * *